US012078119B1

(12) United States Patent
Inoshita

(10) Patent No.: US 12,078,119 B1
(45) Date of Patent: Sep. 3, 2024

(54) ENGINE CONTROLLER

(71) Applicant: TOYOTA JIDOSHA KABUSHIKI KAISHA, Toyota (JP)

(72) Inventor: Kenji Inoshita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/589,453

(22) Filed: Feb. 28, 2024

(30) Foreign Application Priority Data

Mar. 14, 2023 (JP) ................................ 2023-040035

(51) Int. Cl.
*F01N 3/00* (2006.01)
*F01N 3/10* (2006.01)
*F02D 41/02* (2006.01)
*F02D 41/14* (2006.01)

(52) U.S. Cl.
CPC ......... *F02D 41/0235* (2013.01); *F01N 3/101* (2013.01); *F01N 3/106* (2013.01); *F02D 41/1454* (2013.01); *F02D 2200/08* (2013.01)

(58) Field of Classification Search
CPC ............. F02D 41/0235; F02D 41/1454; F02D 2200/08; F01N 3/101; F01N 3/106
See application file for complete search history.

(56) References Cited

U.S. PATENT DOCUMENTS 8,209,954 B2 * 7/2012 Yoshida ................ F01N 3/0842 60/285
2011/0182791 A1 7/2011 Fedeyko et al.
2011/0252766 A1 * 10/2011 Ramanathan ......... F01N 3/0814 60/274
2012/0311998 A1 * 12/2012 Sun ....................... F01N 3/2073 60/285
2014/0079616 A1 3/2014 Fedeyko et al.
2014/0102081 A1 * 4/2014 Toner .................... F01N 3/2066 60/274
2016/0017831 A1 1/2016 Nakagawa et al.
2016/0101413 A1 4/2016 Fedeyko et al.
2017/0009626 A1 * 1/2017 Hagiwara ........... F02D 41/0235
2018/0038293 A1 * 2/2018 Wu ..................... F02D 41/0007
2020/0248607 A1 * 8/2020 Joo ......................... F01N 3/021

FOREIGN PATENT DOCUMENTS

JP 2014515701 A 7/2014
JP 5949957 B2 7/2016

* cited by examiner

*Primary Examiner* — Matthew T Largi

(57) ABSTRACT

An engine controller performs air-fuel ratio sub-feedback control in which a target air-fuel ratio is switched from a rich air-fuel ratio to a lean air-fuel ratio when a rear air-fuel ratio detected by an air-fuel ratio sensor becomes less than or equal to a rich determination value, and the target air-fuel ratio is switched from the lean air-fuel ratio to the rich air-fuel ratio when the rear air-fuel ratio becomes greater than or equal to a lean determination value. To perform the sub-feedback control, the controller variably sets the lean determination value to a value indicating a leaner air-fuel ratio when an amount of overshoot of the rear air-fuel ratio to a richer value than a stoichiometric air-fuel ratio after switching the target air-fuel ratio from the rich air-fuel ratio to the lean air-fuel ratio is relatively large than when the amount of overshoot is relatively small.

2 Claims, 3 Drawing Sheets

ENGINE CONTROLLER

BACKGROUND

1. Field

The present disclosure relates to an engine controller.

2. Description of Related Art

Vehicle on-board engines and the like include an engine having a three-way catalyst in an exhaust passage. The three-way catalyst oxidizes and purifies hydrocarbon (HC) and carbon monoxide (CO) in exhaust gas. Further, the three-way catalyst reduces nitrogen oxide (NOx) in exhaust gas to purify the exhaust gas. The three-way catalyst generates ammonia in a process of reducing NOx.

Japanese National Phase Laid-Open Patent Publication No. 2014-515701 discloses an engine in which an oxidation catalyst is disposed downstream of a three-way catalyst and an injector is provided to supply oxygen to the oxidation catalyst. The oxidation catalyst of such an engine removes ammonia generated by the three-way catalyst by oxidizing the ammonia using oxygen supplied from the injector.

The amount of ammonia generated by the three-way catalyst varies depending on the running condition of the engine. If the amount of ammonia generated changes, the amount of oxygen required for the removal also changes. Thus, the amount of oxygen in the oxidation catalyst needs to be precisely controlled.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An engine controller according to an aspect of the present disclosure is configured to control an engine. The engine includes a three-way catalyst located in an exhaust passage, an oxidation catalyst located in a portion of the exhaust passage downstream of the three-way catalyst, and an air-fuel ratio sensor located in a portion of the exhaust passage downstream of the three-way catalyst and upstream of the oxidation catalyst. A rich determination value is set to a value indicating an air-fuel ratio that is richer than a stoichiometric air-fuel ratio. A lean determination value is set to a value indicating an air-fuel ratio that is leaner than the stoichiometric air-fuel ratio. The air-fuel ratio that is richer than the stoichiometric air-fuel ratio is referred to as a rich air-fuel ratio. The air-fuel ratio that is leaner than the stoichiometric air-fuel ratio is referred to as a lean air-fuel ratio. The engine controller is configured to perform air-fuel ratio sub-feedback control in which an air-fuel ratio of the air-fuel mixture burned in the engine is switched from the rich air-fuel ratio to the lean air-fuel ratio when an air-fuel ratio detection value of the air-fuel ratio sensor becomes a value richer than the rich determination value, and the air-fuel ratio is switched from the lean air-fuel ratio to the rich air-fuel ratio when the air-fuel ratio detection value becomes a value leaner than the lean determination value. The engine controller is configured to variably set the lean determination value to a value indicating a leaner air-fuel ratio when an amount of overshoot of the air-fuel ratio detection value to a richer value than the stoichiometric air-fuel ratio after switching the air-fuel ratio from the rich air-fuel ratio to the lean air-fuel ratio is relatively large than when the amount of overshoot is relatively small.

The engine controller has an effect of enhancing the efficiency of removing ammonia generated by the three-way catalyst.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

An engine controller according to an embodiment will now be described with reference to FIGS. 1 to 4.

Configuration of Engine Controller

Figure 1:
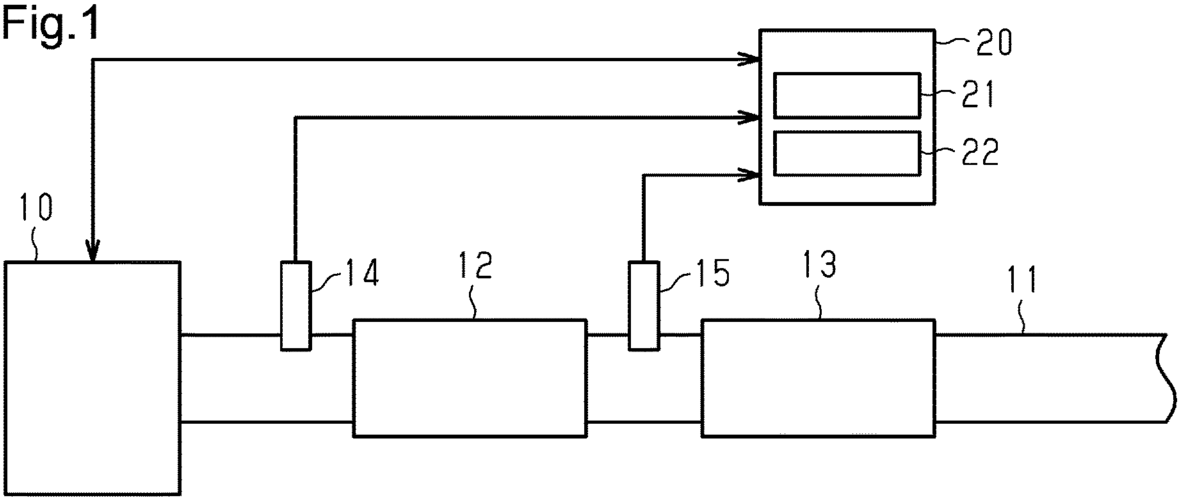
FIG. 1 is a diagram schematically illustrating the configuration of an engine controller according to an embodiment.

An engine 10 shown in FIG. 1 includes a three-way catalyst 12 and an oxidation catalyst 13 that are located in an exhaust passage 11. The oxidation catalyst 13 is disposed in a portion of the exhaust passage 11 downstream of the three-way catalyst 12. The three-way catalyst 12 is a catalytic device that oxidizes hydrocarbon and carbon monoxide in exhaust gas and reduces nitrogen oxide in the exhaust gas. The oxidation catalyst 13 is a catalytic device that oxidizes ammonia in exhaust gas. Each of the three-way catalyst 12 and the oxidation catalyst 13 has an oxygen storage capacity.

Further, the engine 10 includes two air-fuel ratio sensors, namely, a first air-fuel ratio sensor 14 and a second air-fuel ratio sensor 15. The first air-fuel ratio sensor 14 is disposed in a portion of the exhaust passage 11 upstream of the three-way catalyst 12. The second air-fuel ratio sensor 15 is disposed in a portion of the exhaust passage 11 downstream of the three-way catalyst 12 and upstream of the oxidation catalyst 13.

An ECU 20, which corresponds to the engine controller for controlling the engine 10, includes a processor 21 and a memory 22. The memory 22 stores programs and data that are used for engine control. The processor 21 reads and executes a program stored in the memory 22 so that the ECU 20 executes various processes related to engine control. The ECU 20 receives detection signals from various sensors that detect the running state of the engine 10, including the first air-fuel ratio sensor 14 and the second air-fuel ratio sensor 15. The ECU 20 controls an intake air amount GA, a fuel injection amount, an ignition timing, and the like of the engine 10 based on the detection results of these sensors.

Air-Fuel Ratio Control

The ECU 20 controls the air-fuel ratio of air-fuel mixture burned in the engine 10 based on the detection results of the first air-fuel ratio sensor 14 and the second air-fuel ratio sensor 15. The air-fuel ratio control is performed through two feedback controls, namely, main feedback control based on the detection result of the first air-fuel ratio sensor 14 and sub-feedback control based on the detection result of the second air-fuel ratio sensor 15. The ECU 20 performs main feedback control by adjusting the fuel injection amount based on the deviation between the detection value of the air-fuel ratio by the first air-fuel ratio sensor 14 and the target air-fuel ratio so as to reduce the deviation. In the sub-feedback control, the ECU 20 alternately switches the target air-fuel ratio of the main feedback control between a lean air-fuel ratio, which is an air-fuel ratio that is leaner than the stoichiometric air-fuel ratio, and a rich air-fuel ratio, which is an air-fuel ratio that is richer than the stoichiometric air-fuel ratio.

Figure 2:
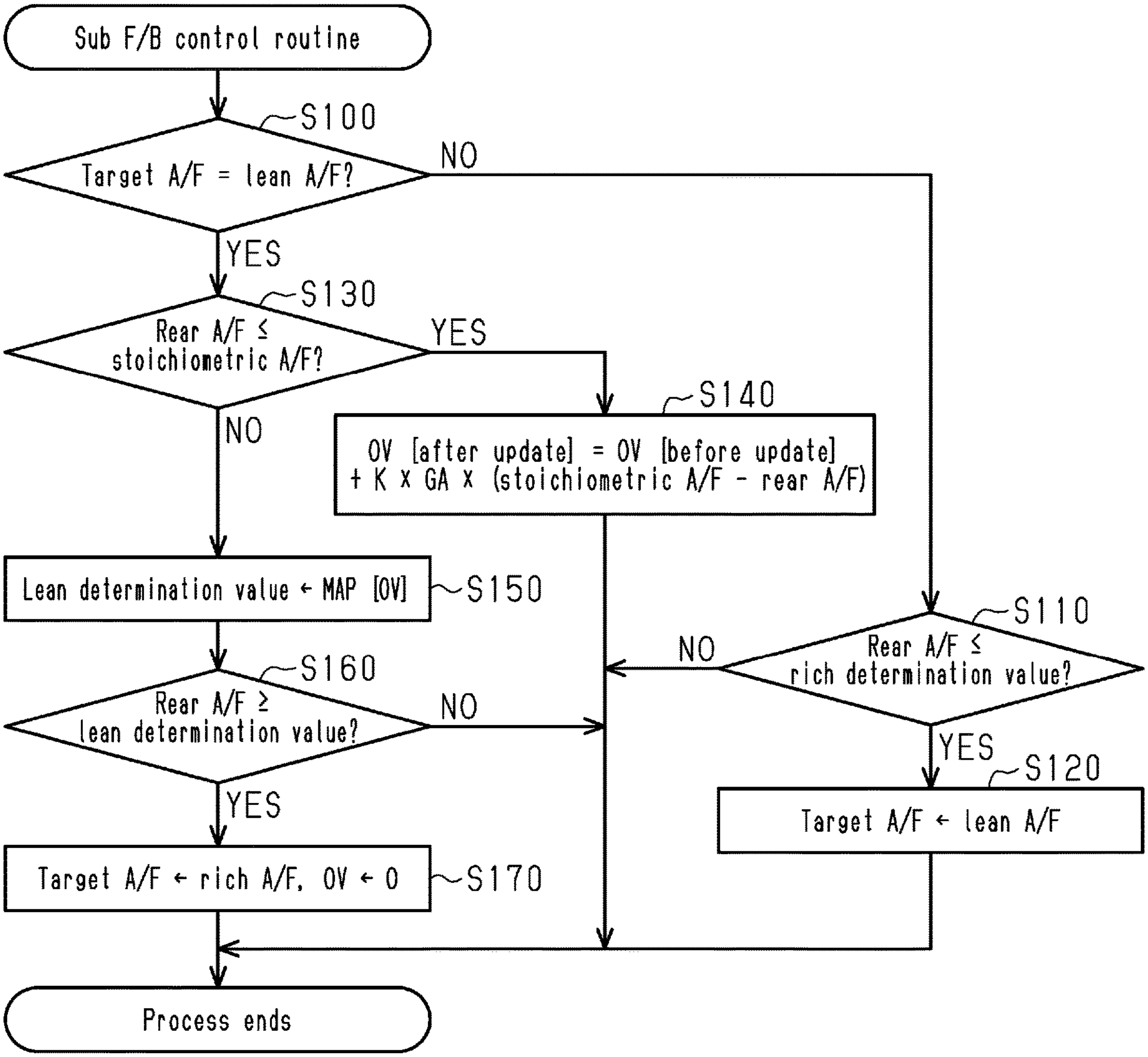
FIG. 2 is a flowchart of an air-fuel ratio sub-feedback control routine executed by the engine controller.

FIG. 2 illustrates a flowchart of a sub-feedback control routine executed by the ECU 20 for sub-feedback control. While the engine 10 is running, the ECU 20 repeatedly executes the routine at predetermined control cycles. In FIG. 2, "F/B" represents feedback, and "A/F" represents the air-fuel ratio. Further, in the following description, the detection value of the air-fuel ratio of the second air-fuel ratio sensor 15 will be referred to as a rear air-fuel ratio.

When starting this routine, the ECU 20 first determines in step S100 whether the target air-fuel ratio is set to the lean air-fuel ratio. When the target air-fuel ratio is not set to the lean air-fuel ratio (NO), that is, when the target air-fuel ratio is set to the rich air-fuel ratio, the ECU 20 determines in step S110 whether the rear air-fuel ratio is less than or equal to a predetermined rich determination value. When the rear air-fuel ratio is greater than the rich determination (NO), the ECU 20 ends the process of this routine in the current control cycle. When the rear air-fuel ratio is greater than or equal to the rich determination value (YES), the ECU 20 switches the target air-fuel ratio from the rich air-fuel ratio to the lean air-fuel ratio in step S120, and then ends the process of this routine in the current control cycle.

When the target air-fuel ratio is set to the lean air-fuel ratio (S100: YES), the ECU 20 determines whether the rear air-fuel ratio is less than a stoichiometric air-fuel ratio in step S130. That is, in step S130, the ECU 20 determines whether the rear air-fuel ratio is a value indicating an air-fuel ratio richer than the stoichiometric air-fuel ratio. When the rear air-fuel ratio is less than the stoichiometric air-fuel ratio (YES), the ECU 20 updates the value of an ammonia generation amount OV in step S140, and then ends the process of this routine in the current control cycle. The ammonia generation amount OV represents an estimated value of the amount of ammonia generated in the three-way catalyst 12 after switching of the target air-fuel ratio from the rich air-fuel ratio to the lean air-fuel ratio. In step S140, the ECU 20 updates the ammonia generation amount OV by setting the updated value to a value that satisfies the relationship of expression (1). In expression (1), "GA" represents the intake air amount of the engine 10, and "K" represents a predetermined coefficient.

$$OV[\text{after update}] \leftarrow OV[\text{before update}] + K \times GA \times (\text{stoichiometric air-fuel ratio minus rear air-fuel ratio}) \quad (1)$$

When the rear air-fuel ratio is greater than or equal to the stoichiometric air-fuel ratio (S130: NO), that is, when the rear air-fuel ratio is the stoichiometric air-fuel ratio or an air-fuel ratio leaner than the stoichiometric air-fuel ratio, the ECU 20 proceeds to step S150. In step S150, the ECU 20 sets the lean determination value based on the ammonia generation amount OV. In the case of the present embodiment, the ECU 20 sets the lean determination value using a map stored in advance in the memory 22.

Figure 3:
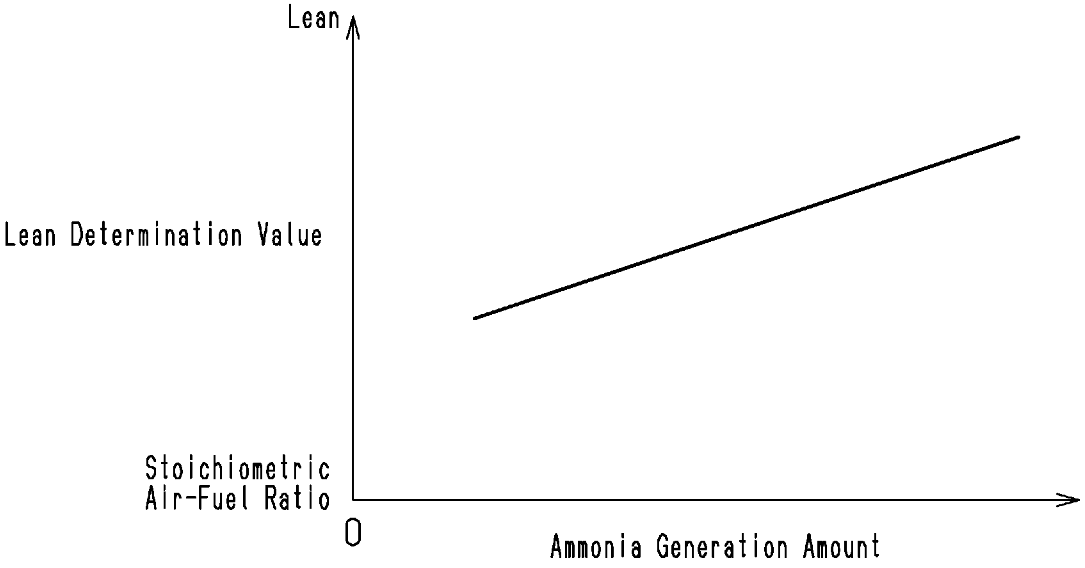
FIG. 3 is a graph illustrating the relationship between the ammonia generation amount and the rich determination value.

FIG. 3 illustrates the relationship between the ammonia generation amount OV and the lean determination value in the map. The lean determination value is set to a larger value when the ammonia generation amount OV is relatively large than when the ammonia generation amount OV is relatively small within a range of values indicating an air-fuel ratio leaner than the stoichiometric air-fuel ratio.

In the following step S160, the ECU 20 determines whether the rear air-fuel ratio is greater than or equal to the lean determination value. When the rear air-fuel ratio is less than the lean determination value (NO), the ECU 20 ends the process of this routine in the current control cycle. When the rear air-fuel ratio is greater than or equal to the lean determination value (YES), the ECU 20 switches the target air-fuel ratio from the lean air-fuel ratio to the rich air-fuel ratio in step S170. Further, in step S170, the ECU 20 clears the value of the ammonia generation amount OV to 0, and then ends the process of this routine in the current control cycle.

Operation and Advantage of Present Embodiment

The operation and advantages of the present embodiment will now be described.

Figure 4:
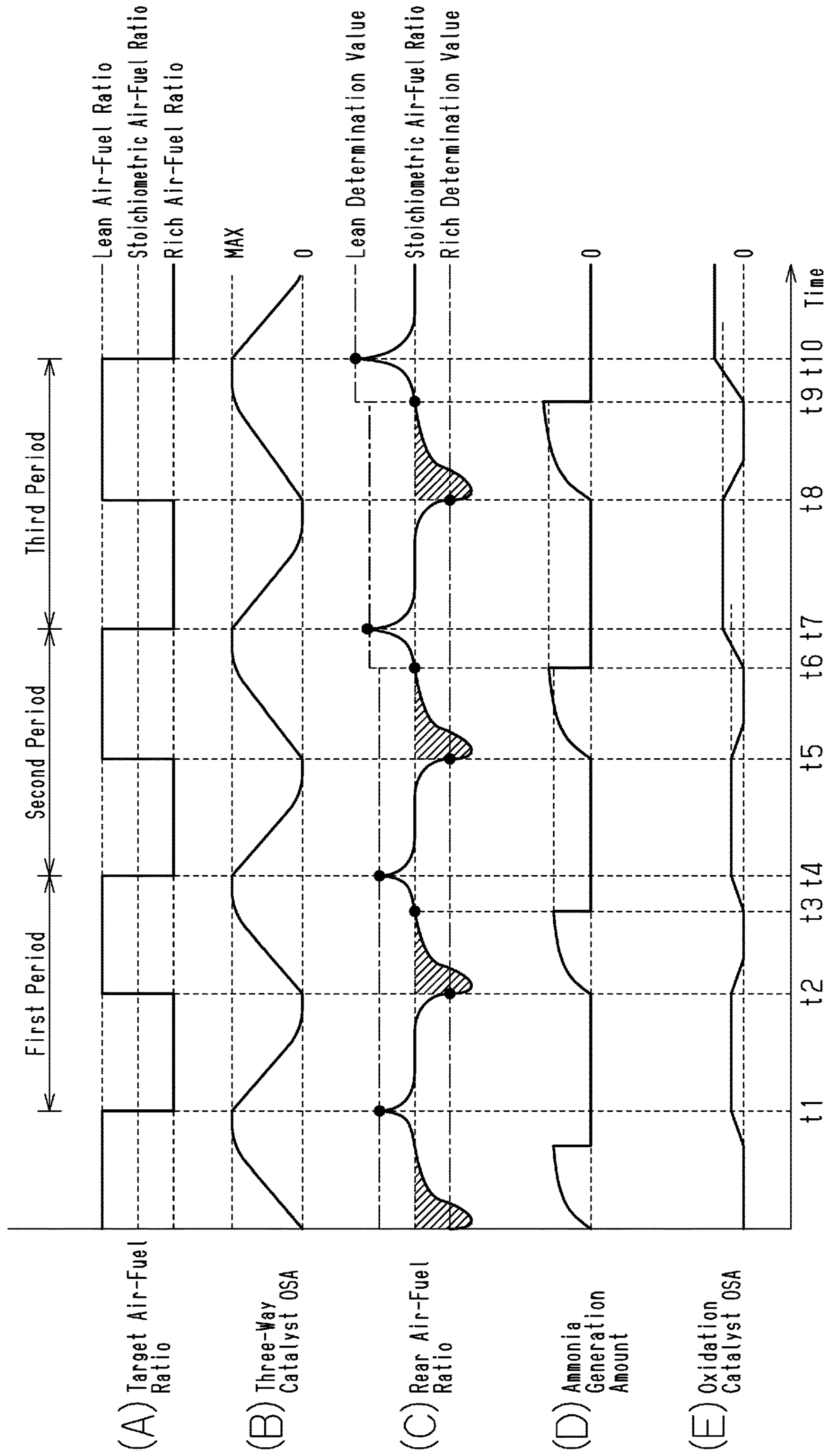
FIG. 4 is a timing diagram illustrating various parameters during execution of the air-fuel ratio sub-feedback control by the engine controller, where section (A) illustrates changes in the target air-fuel ratio, section (B) illustrates changes in the oxygen storage amount of the three-way catalyst, section (C) illustrates changes in the rear air-fuel ratio, section (D) illustrates changes in the ammonia generation amount of the three-way catalyst, and section (E) illustrates changes in the oxygen storage amount of the oxidation catalyst.

FIG. 4 illustrates how sub-feedback control is performed. Section (A) of FIG. 4 shows changes in the target air-fuel ratio, section (B) of FIG. 4 shows changes in the oxygen storage amount (OSA) of the three-way catalyst 12, and section (C) of FIG. 4 shows changes in the rear air-fuel ratio. Further, section (D) of FIG. 4 shows changes in the ammonia generation amount OV of the three-way catalyst 12, and section (E) of FIG. 4 shows changes in the oxygen storage amount of the oxidation catalyst 13. In the following description, combustion at an air-fuel ratio leaner than the stoichiometric air-fuel ratio is referred to as lean combustion, and combustion at an air-fuel ratio richer than the stoichiometric air-fuel ratio is referred to as rich combustion.

In sub-feedback control, when the rear air-fuel ratio becomes greater than or equal to the lean determination value during lean combustion, the ECU 20 switches the target air-fuel ratio from the lean air-fuel ratio to the rich air-fuel ratio to start rich combustion. In the case of FIG. 4, the rich combustion is started at times t1, t4, t7, t10.

Exhaust gas having high concentrations of carbon monoxide (CO) and hydrocarbon (HC), which are unburned fuel components, flows into the three-way catalyst 12 during rich combustion. The three-way catalyst 12 purifies the unburned fuel component in the exhaust gas by releasing oxygen stored during lean combustion. The rear air-fuel ratio after the start of the rich combustion indicates a value relatively near the stoichiometric air-fuel ratio while the three-way catalyst 12 is releasing the stored oxygen to purify the unburned fuel component. Thereafter, when the oxygen storage amount of the three-way catalyst 12 approaches 0, the rear air-fuel ratio changes to the rich side from the stoichiometric air-fuel ratio.

The ECU 20 switches the target air-fuel ratio from the rich air-fuel ratio to the lean air-fuel ratio and starts the lean combustion when the rear air-fuel ratio becomes less than or equal to the rich determination value after the start of the rich combustion. In the case of FIG. 4, lean combustion is started at times t2, t5, t8. During lean combustion, exhaust gas having high concentrations of NOx and oxygen flows into the three-way catalyst 12. At this time, the three-way catalyst 12 absorbs oxygen in the exhaust gas to form a reducing atmosphere, thereby removing NOx in the exhaust gas.

There is a limit to the amount of oxygen that can be stored by the three-way catalyst 12. In the following description, the upper limit of the amount of oxygen that can be stored in the three-way catalyst 12 is referred to as a maximum storage amount. When the oxygen storage amount of the three-way catalyst 12 approaches the maximum occlusion amount, oxygen that has not been fully stored flows out of the three-way catalyst 12. As a result, the rear air-fuel ratio changes from a value indicating an air-fuel ratio richer than the stoichiometric air-fuel ratio to a value indicating an air-fuel ratio leaner than the stoichiometric air-fuel ratio. In the case of FIG. 4, at times t3, t6, t9, the rear air-fuel ratio changes to a value indicating an air-fuel ratio leaner than the stoichiometric air-fuel ratio Thereafter, when the rear air-fuel ratio becomes greater than or equal to the lean determination value, as described above, the ECU 20 switches the target air-fuel ratio from the lean air-fuel ratio to the rich air-fuel ratio.

The unburned fuel component that has flowed into the three-way catalyst 12 during the rich combustion remains in the three-way catalyst 12 immediately after the start of the lean combustion. During the period in which the unburned fuel component remains in the three-way catalyst 12 after the start of the lean combustion, ammonia is generated by the reaction represented by expression (2) in the process of reducing NOx in the exhaust gas. Ammonia is generated using carbon monoxide, which is an unburned fuel component. Thus, when the amount of the unburned fuel component remaining in the three-way catalyst 12 at the start of the lean combustion is relatively large, the amount of ammonia generated in the three-way catalyst 12 is also relatively large.

$$NO+CO+H_2O \rightarrow NH_3+CO_2 \qquad (2)$$

The ECU 20 estimates the amount of ammonia generated in the three-way catalyst 12. The ammonia generation amount OV of the ECU 20 is estimated in the following manner.

The unburned fuel component remaining inside flows out of the three-way catalyst 12 immediately after the start of lean combustion. Thus, while unburned fuel component continues to flow out after the start of the lean combustion, the rear air-fuel ratio becomes a richer value indicating an air-fuel ratio than the stoichiometric air-fuel ratio. That is, the rear air-fuel ratio immediately after switching of the air-fuel ratio from the rich air-fuel ratio to the lean air-fuel ratio overshoots to a value richer than the stoichiometric air-fuel ratio. The amount of deviation of the rear air-fuel ratio to a value richer than the stoichiometric air-fuel ratio (i.e., stoichiometric air-fuel ratio minus rear air-fuel ratio) at this time becomes a value indicating the concentration of the unburned fuel component in the exhaust gas flowing out of the three-way catalyst 12. In the following description, the deviation amount, that is, the difference obtained by subtracting the rear air-fuel ratio from the stoichiometric air-fuel ratio will be referred to as a rich deviation amount. The amount of the unburned fuel component flowing out of the three-way catalyst 12 is obtained as the product of the rich deviation amount and the exhaust gas flow rate. The exhaust flow rate is an amount that is substantially proportional to the intake air amount GA. In step S140 of FIG. 2, the ECU 20 calculates a value proportional to the amount of unburned fuel components flowing out of the three-way catalyst 12 as the update amount of the ammonia generation amount OV.

When the unburned fuel component remaining in the three-way catalyst 12 completely flows out, the rear air-fuel ratio becomes a value indicating an air-fuel ratio leaner than the stoichiometric air-fuel ratio. In the following description, the period from the point in time when the air-fuel ratio is switched from the rich air-fuel ratio to the lean air-fuel ratio to the point in time when the rear air-fuel ratio becomes a value leaner than the stoichiometric air-fuel ratio will be referred to as an overshoot period. The integrated value of the update amount in the overshoot period becomes a value proportional to the total amount of the unburned fuel component flowing out from the three-way catalyst 12 after the start of the lean combustion. This value is proportional to the amount of the unburned fuel component remaining in the three-way catalyst 12 at the start of lean combustion. In the following description, the amount of the unburned fuel component remaining in the three-way catalyst 12 at the start of the lean combustion is referred to as a remaining unburned fuel component amount.

As shown in the above expression (2), ammonia is generated in the three-way catalyst 12 using CO, which is an unburned fuel component. Thus, when the remaining unburned fuel component amount is relatively large, the ammonia generation amount OV of the three-way catalyst 12 also increases. In the sub-feedback control routine of FIG. 2, the ECU 20 calculates a value proportional to the amount of remaining unburned components as the value of the ammonia generation amount OV. In this way, the ECU 20 estimates the ammonia generation amount OV of the three-way catalyst 12 based on the amount of overshooting of the rear air-fuel ratio to the rich side from the stoichiometric air-fuel ratio after the start of lean combustion.

The ammonia generated by the three-way catalyst 12 flows into the oxidation catalyst 13 located downstream. When a sufficient amount of oxygen is stored in the oxidation catalyst 13, the oxidation catalyst 13 removes ammonia through reactions represented by expression (3) and expression (4).

$$2CeO_2+NH_3 \rightarrow Ce_2O_3+N_2+H_2O \qquad (3)$$

$$NH_{3+3}NO \rightarrow N_2+H_2O \qquad (4)$$

When the oxygen storage amount of the oxidation catalyst 13 is insufficient relative to the amount of ammonia generated by the three-way catalyst 12, ammonia that has not been completely removed is discharged to external air. The period during which the exhaust gas having a high oxygen concentration flows in and the oxidation catalyst 13 stores oxygen is a period from the point in time when the three-way catalyst 12 becomes unable to store oxygen in the exhaust gas after the start of the lean combustion to the point in time when the lean combustion ends. In the following description, such a period is referred to as an oxygen storage period for the oxidation catalyst 13. In the case of FIG. 4, the period from time t3 to time t4, the period from time t6 to time t7, and the period from time t9 to time t10 correspond to the oxygen storage period for the oxidation catalyst 13.

In FIG. 4, the period from time t1 to time t4 is referred to as a first period, the period from time t4 to time t7 is referred to as a second period, and the period from time t7 to time t10 is referred to as a third period. The exhaust flow rate during the period shown in FIG. 4 is constant. In this case, the ammonia generation amount OV of the three-way catalyst 12 in each period is proportional to the area of the hatched portion in section (B) of FIG. 4. In the case of FIG. 4, the ammonia generation amount OV in the second period is larger than that in the first period, and the ammonia generation amount OV in the third period is even larger than that in the second period.

In the sub-feedback control routine of FIG. 2, the ECU 20 sets the lean determination value to a leaner value when the ammonia generation amount OV is relatively large than when the ammonia generation amount OV is relatively small. In the case of FIG. 4, the lean determination value is set to a leaner value in the second period than in the first period, and the lean determination value is set to a leaner value in the third period than in the second period. When the lean determination value is changed to a leaner value, the oxygen storage period for the oxidation catalyst 13 becomes longer. Thus, the amount of oxygen stored by the oxidation catalyst 13 during this period becomes larger. As a result, the amount of ammonia that can be removed by the oxidation catalyst 13 in the next period increases. In this manner, the ECU 20 adjusts the oxygen storage amount of the oxidation catalyst 13 to an amount required to remove ammonia by variably setting the lean determination value in accordance with the ammonia generation amount OV of the three-way catalyst 12.

In the engine controller of the present embodiment, the second air-fuel ratio sensor 15 corresponds to an air-fuel ratio sensor that is disposed in a portion of the exhaust passage 11 downstream of the three-way catalyst 12 and upstream of the oxidation catalyst 13. Further, the rear air-fuel ratio, which is the value of the air-fuel ratio detected by the second air-fuel ratio sensor 15, corresponds to an air-fuel ratio detection value.

The engine controller of the present embodiment provides the following advantages.

(1) In the engine controller of the present embodiment, the ECU 20 estimates the ammonia generation amount OV of the three-way catalyst 12. The ECU 20 variably sets the lean determination value in the air-fuel ratio sub-feedback control such that the lean determination value becomes a leaner value when the ammonia generation amount OV is relatively large than when the ammonia generation amount OV is relatively small. Depending on the ammonia generation amount OV, the oxygen storage amount of the oxidation catalyst 13 can be adjusted in order to obtain a sufficient amount necessary for the removal. Therefore, the efficiency of removing ammonia generated by the three-way catalyst 12 can be enhanced.

(2) The ECU 20 calculates the ammonia generation amount OV of the three-way catalyst 12 based on the amount of overshooting of the rear air-fuel ratio to a value richer than the stoichiometric air-fuel ratio after the air-fuel ratio is switched from the rich air-fuel ratio to the lean air-fuel ratio. Specifically, the ECU 20 calculates, as the ammonia generation amount OV, the integrated value of the product of the rich deviation amount in the rear air-fuel ratio and the exhaust gas flow rate in the overshooting period after the start of lean combustion. Thus, the ammonia generation amount OV of the three-way catalyst 12 is accurately estimated.

(3) The ammonia generation amount OV of the three-way catalyst 12 changes depending on the state of the catalyst. For example, the amount of ammonia generated increases. The aged three-way catalyst 12 has a lower catalyst activity than the three-way catalyst 12 immediately after production. Thus, the ammonia generation amount OV becomes smaller. The engine controller of the present embodiment maintains an appropriate ammonia removal ability corresponding to such a temporal change in the activation state of the three-way catalyst 12.

Modifications

The present embodiment may be modified as follows. The present embodiment and the following modifications can be combined as long as they remain technically consistent with each other.

The ammonia generation amount OV may be calculated in a manner different from the above embodiment if it is based on the amount of overshoot of the rear air-fuel ratio to the rich side of the stoichiometric air-fuel ratio. For example, the ammonia generation amount OV may be calculated based on a peak value of the rich deviation amount in the overshoot period. Alternatively, the ammonia generation amount OV may be calculated based on the length of the overshoot period.

The engine controller according to the above embodiment and the modifications may be applied to an engine having a configuration different from that shown in FIG. 1 if the three-way catalyst 12, the oxidation catalyst 13, and the second air-fuel ratio sensor 15 are disposed in this order from the upstream side of the exhaust passage 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine controller configured to control an engine, wherein the engine includes:

a three-way catalyst located in an exhaust passage;

an oxidation catalyst located in a portion of the exhaust passage downstream of the three-way catalyst; and an air-fuel ratio sensor located in a portion of the exhaust passage downstream of the three-way catalyst and upstream of the oxidation catalyst, a rich determination value is set to a value indicating an air-fuel ratio that is richer than a stoichiometric air-fuel ratio, a lean determination value is set to a value indicating an air-fuel ratio that is leaner than the stoichiometric air-fuel ratio, the air-fuel ratio that is richer than the stoichiometric air-fuel ratio is referred to as a rich air-fuel ratio, the air-fuel ratio that is leaner than the stoichiometric air-fuel ratio is referred to as a lean air-fuel ratio, and the engine controller is configured to:

perform air-fuel ratio sub-feedback control in which an air-fuel ratio of the air-fuel mixture burned in the engine is switched from the rich air-fuel ratio to the lean air-fuel ratio when an air-fuel ratio detection value of the air-fuel ratio sensor becomes a value richer than the rich determination value, and the air-fuel ratio is switched from the lean air-fuel ratio to the rich air-fuel ratio when the air-fuel ratio detection value becomes a value leaner than the lean determination value; and calculate an ammonia generation amount of the three-way catalyst based on an amount of overshoot of the air-fuel ratio detection value to a value richer than the stoichiometric air-fuel ratio after switching the air-fuel ratio from the rich air-fuel ratio to the lean air-fuel ratio, and variably set the lean determination value to a value indicating a leaner air-fuel ratio when the ammonia generation amount is relatively large than when the ammonia generation amount is relatively small.

2. The engine controller according to claim 1, wherein the ammonia generation amount is calculated as a value obtained by integrating a product of a rich deviation amount and an exhaust gas flow rate for an overshoot period, the overshoot period is a period from the point in time when the air-fuel ratio is switched from the rich air-fuel ratio to the lean air-fuel ratio to the point in time when the air-fuel ratio detection value becomes a value leaner than the stoichiometric air-fuel ratio, and the rich deviation amount is a difference obtained by subtracting the air-fuel ratio detection value from the stoichiometric air-fuel ratio.

* * * * *